US011166221B2

(12) United States Patent
Desai et al.

(10) Patent No.: US 11,166,221 B2
(45) Date of Patent: Nov. 2, 2021

(54) ETHERNET BRIDGING IN SDN-BASED WIRELESS MESH NETWORKS

(71) Applicant: Cisco Technology, Inc., San Jose, CA (US)

(72) Inventors: Vishal Satyendra Desai, San Jose, CA (US); Gautam Bhanage, Milpitas, CA (US); Khashayar Mirfakhraei, Los Altos, CA (US); Ardalan Alizadeh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1 day.

(21) Appl. No.: 16/841,633

(22) Filed: Apr. 6, 2020

(65) Prior Publication Data

US 2021/0314845 A1     Oct. 7, 2021

(51) Int. Cl.
*H04W 40/24*       (2009.01)
*H04W 28/10*       (2009.01)

(52) U.S. Cl.
CPC ......... *H04W 40/246* (2013.01); *H04W 28/10* (2013.01); *H04W 40/248* (2013.01)

(58) Field of Classification Search
None
See application file for complete search history.

(56) References Cited

U.S. PATENT DOCUMENTS

| 7,688,756 | B2 | 3/2010 | Allan et al. | |
|---|---|---|---|---|
| 9,148,223 | B2 | 9/2015 | Blair | |
| 9,634,928 | B2 | 4/2017 | Choudhury et al. | |
| 2008/0107027 | A1 | 5/2008 | Allan et al. | |
| 2013/0332399 | A1* | 12/2013 | Reddy | H04L 43/0852 706/12 |
| 2015/0169340 | A1* | 6/2015 | Haddad | G06F 9/45533 718/1 |
| 2015/0382278 | A1* | 12/2015 | Fallon | H04L 45/54 370/338 |
| 2016/0094398 | A1* | 3/2016 | Choudhury | H04L 45/42 370/254 |
| 2017/0272317 | A1* | 9/2017 | Singla | H04W 12/06 |
| 2018/0013630 | A1* | 1/2018 | Tatlicioglu | H04L 41/12 |
| 2018/0359699 | A1 | 12/2018 | Strong et al. | |
| 2019/0036828 | A1* | 1/2019 | Bajaj | H04L 41/5025 |
| 2019/0045370 | A1* | 2/2019 | Al-Fanek | H04W 16/14 |
| 2019/0104458 | A1* | 4/2019 | Svennebring | H04W 76/27 |

* cited by examiner

Primary Examiner — Kenny S Lin
(74) Attorney, Agent, or Firm — Polsinelli PC

(57) ABSTRACT

The present technology enables inter-network routing by dynamically optimizing data paths for traffic destined for wired clients attached to a wireless access point in a wireless mesh network with a plurality of wireless access points. The present technology can also influence steering of wireless device connections within the wireless mesh network when high amounts of data traffic are exchanged between nearby mesh wireless access points.

12 Claims, 11 Drawing Sheets

ETHERNET BRIDGING IN SDN-BASED WIRELESS MESH NETWORKS

TECHNICAL FIELD

The present technology pertains to improving handling of wired clients in wireless mesh networks and more specifically to improving routing paths towards a wired client attached to a wireless access point in wireless mesh networks.

BACKGROUND

A wireless mesh network includes wireless access points connected to each other through a network of wireless backhaul links. A root access point of the wireless mesh network, which has a wired connection to a wired network, connects with wireless access points through the backhaul links. A controller connected to the wired network provides central control of the wireless mesh network. The controller connects with the root access point to route data traffic in the wireless mesh network. Wireless access points in the wireless mesh network have no wired connection to the controller and can be used to connect to peripheral devices. Peripheral devices can include wired devices such as laptops and cameras that connect to wireless access point via wired link. Peripheral devices can also include wireless devices such as cell phones and PDAs that wirelessly connect to wireless access point.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION OF EXAMPLE EMBODIMENTS

Figure 1:
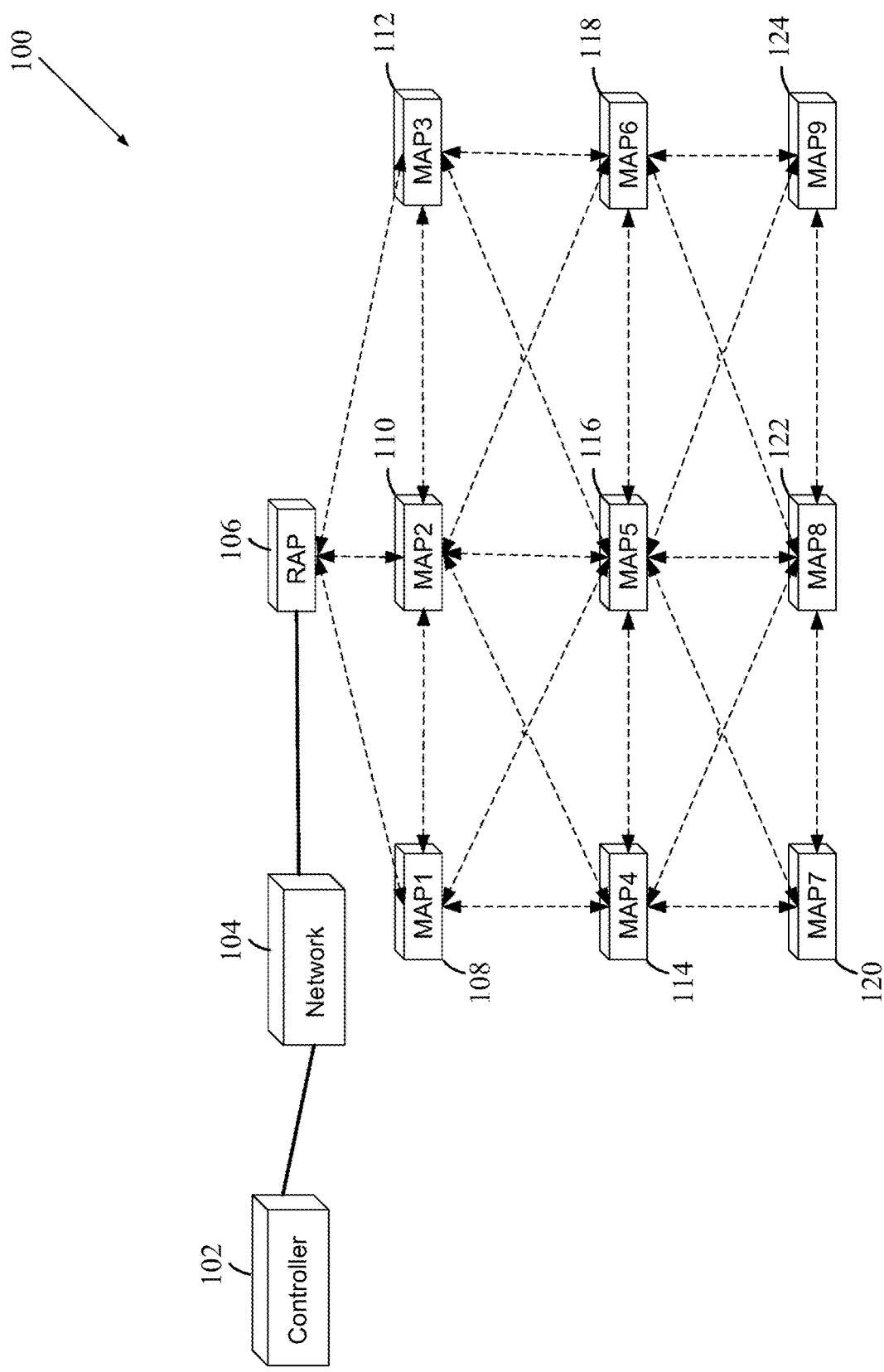
FIG. 1 illustrates an example topology of a wireless mesh network in accordance with some aspects of present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present technology can include a software-defined networking (SDN) controller that can learn of a wired connection of a first wired device to a first wireless access point in a wireless mesh network. Thereafter, the SDN controller can update a forwarding table for distribution to wireless access points in the wireless mesh network. The forwarding table includes a representation of the connection between the first wired device and the first wireless access point. Thereby, the wireless access points can determine data paths toward a wired device attached to a wireless access point using the forwarding table rather than having to route the data to the top of the network first, which results in a more efficient operation of the wireless mesh network.

The present technology also includes a system that can include a first wireless access point that is programmed with computer executable instructions to enable the first wireless access point to receive data that has a second wired device as its destination. The first wireless access point can look up an address of the second wired device in a forwarding table, wherein the forwarding table indicates client devices having wired connections to other access points in the wireless mesh network. Specifically, to the first wireless access point can be programmed with instructions to determine that the address of the second wired device is connected to a second wireless access point and forward the data to the next access point in the wireless mesh network in a forwarding path to the second wireless access point as indicated in the forwarding table.

Detailed Description

In wireless mesh networks, there are sometimes devices that are directly connected to one of wireless access points in the wireless mesh network via wired link. An example of a wired-connected device can be a video camera. Optimal routing between such wired-connected devices, which can be equivalently called "Ethernet bridging", is needed in wireless mesh networks.

Some deployments of wireless mesh networks are based on an administrator configured static routing of such wired devices in wireless mesh access points such that data flowing to a wired device is generally directed to the top of the network even when the source of the data would provide for a more direct path for the data. This static configuration means that the quality of service for Ethernet bridging devices suffers from any instability/changes in the wireless mesh network, which is something unavoidable based on the nature of wireless mesh networks (i.e., the data path does not dynamically change to promote efficient data paths, or to accommodate changes in wireless connections in the wireless mesh network). Software-defined networking (SDN) can be a potential solution for providing a highly dynamic routing strategy for Ethernet bridging devices based on several metrics extracted from the Ethernet bridging devices. This present technology provides a solution to take advantage of software-defined networking to provide better services for wired devices connected to wireless access points in a wireless mesh network.

A wireless mesh network includes wireless access points connected to each other through a network of wireless backhaul links. A root access point of the wireless mesh network has a wired connection to a wired network and connects with wireless access points through the backhaul links. A software-defined networking (SDN) controller connected to the wired network provides central control of the wireless mesh network. Software-defined networking is a conceptual framework in which network are treated as abstractions and are controlled programmatically, with minimal direct touch of individual network components. SDN tries to fulfill a need to configure network devices more dynamically. This is achieved by taking away the process of making decisions about packet handling from every single device. Instead, a logically centralized controller, so-called SDN controller is deployed to make these decisions for all devices in the entire network. The SDN controller connects with each root access point to route data traffic associated with the wireless access points.

Wireless access points in the wireless mesh network have no wired connection to the SDN controller. They can be completely wireless and support clients that communicate with other wireless access points or the root access point, or they can be used to connect to peripheral devices or a wired network. Deployments of such wireless mesh networks are not following a dynamic routing strategy. The overhead of routing algorithm is very high and most wireless mesh networks are useful for small-scale deployments where the distance between wireless access points are short and benefits of dynamic routing might not be worth the cost. In these deployments, all traffic is passed to the root access point. Directing all traffic to the root access point is not necessarily the best route (based on shortest path or other metrics) inside the wireless mesh network. Sometimes traffic directed to the root access point needs to pass through a wireless access point twice or even more on its way to a destination. Therefore, data traffic follows a non-optimal path in the wireless mesh network.

Software-Defined Networking (SDN) is a conceptual framework in which networks are treated as abstractions and are controlled programmatically, with minimal direct touch of individual network components. SDN tries to fulfill a need to configure network devices more flexible and dynamically. This is achieved by taking away the process of making decisions about packet handling from every single device. Instead, a logically centralized SDN controller entity is deployed to make these decisions for all devices in the entire network.

A combined SDN and wireless mesh network is a challenging task due to the different natures of both concepts. SDN describes networks with homogeneous, static, and centralized controlled topologies. In contrast, a wireless mesh network is characterized by a dynamic and distributed network control.

As explained above, in current deployments, routing paths are administrator configured and static such that data flowing to a wired device attached to a wireless mesh network is generally directed to the top of the network even when the source of the data would provide for a more direct path for the data. This will increase the risk of losing quality of service for Ethernet bridging devices, for example when a wireless access point suddenly comes out of the wireless mesh network. Moreover, based on the applications that Ethernet bridging devices are requesting, the optimal routing strategy might be different. Herein, a new method is proposed to optimize data paths between devices connected by a wired link to wireless access points in the wireless mesh network and other devices in the wireless mesh network. Further, the present technology leverages Ethernet bridging to connect the wired device to the wireless access point and leverages an SDN-based controller to influence admission and steering of a wireless device connected to a wireless access point when high amount of traffic is exchanged between nearby wireless access points.

The SDN-based architecture proposed in herein separates the data and control traffic. Therefore, routing of Ethernet bridged devices can be dynamically managed by a SDN controller while not impacting the data traffic loaded on the entire wireless mesh network. The proposed solution can significantly improve the network efficiency in terms of load balancing between wireless access points as well as latency in inter-network communication. Latency-sensitive applications, such as voice/video, involving wired client devices are some examples that will benefit from optimized data path in the wireless mesh network. The optimized path lessens number of involved wireless access points and reduces WiFi contention observed in the backhaul links.

FIG. 1 is a block diagram of an example of a wireless mesh network 100. While pertinent features are shown, those of ordinary skill in the art will appreciate from the present disclosure that various other features have not been illustrated for the sake of brevity and so as not to obscure aspects of the example implementations disclosed herein.

In this example, the wireless mesh network 100 can include a SDN controller 102, a root access point 106, and a plurality of wireless access points 108, 110, 112, 114, 116, 118, 120, 122, and 124. The plurality of wireless access points communicate among themselves and back to the root access point 106 using a wireless network of backhaul links, which are shown by dashed bi-directional arrows. A wired network 104 is coupled to the root access point 106. The wired network 104 can include one or more local area networks and one or more wide area networks. The SDN controller 102 is in charge of controlling the wired network 104, the root access point 106, and the plurality of wireless access points.

In FIG. 1, relationships among wireless access points are defined as a parent, child, or neighbor. According to the definition, a parent wireless access point offers the best route back to root access point based on its ease values. Ease values can be defined as minimum number of wireless access points along a communication path from a wireless access point to a root access point. A parent wireless access point can be either root access point itself or another wireless access point. For example in FIG. 1, in communication between the wireless access point 116 and the root access point 106, all three wireless access point 108, the wireless access point 110, and the wireless access point 112 can be considered as parent wireless access points. As another example, if the wireless access point 118 wants to communicate with the root access point 106, the wireless access point 110 and the wireless access point 112 can be considered as parent wireless access points.

According to the definition, a child wireless access point selects the parent wireless access point as its best route back to root access point. For example in FIG. 1, in communication between the wireless access point 116 and the root access point 106 via the parent wireless access point 110, the wireless access point 116 is the child. As another example, in communication between the wireless access point 124 and the root access point 106 via the parent wireless access point 118 and the parent wireless access point 112, the wireless access point 124 is considered the child.

According to the definition, a neighbor wireless access point is within the RF range of another wireless access point but it is not selected as its parent or a child because its ease values are lower than that of the parent. For example in FIG. 1, in communication between the wireless access point 110 and the root access point 106, the wireless access point 108 and the wireless access point 112 are considered neighbor wireless access points.

Figure 2:
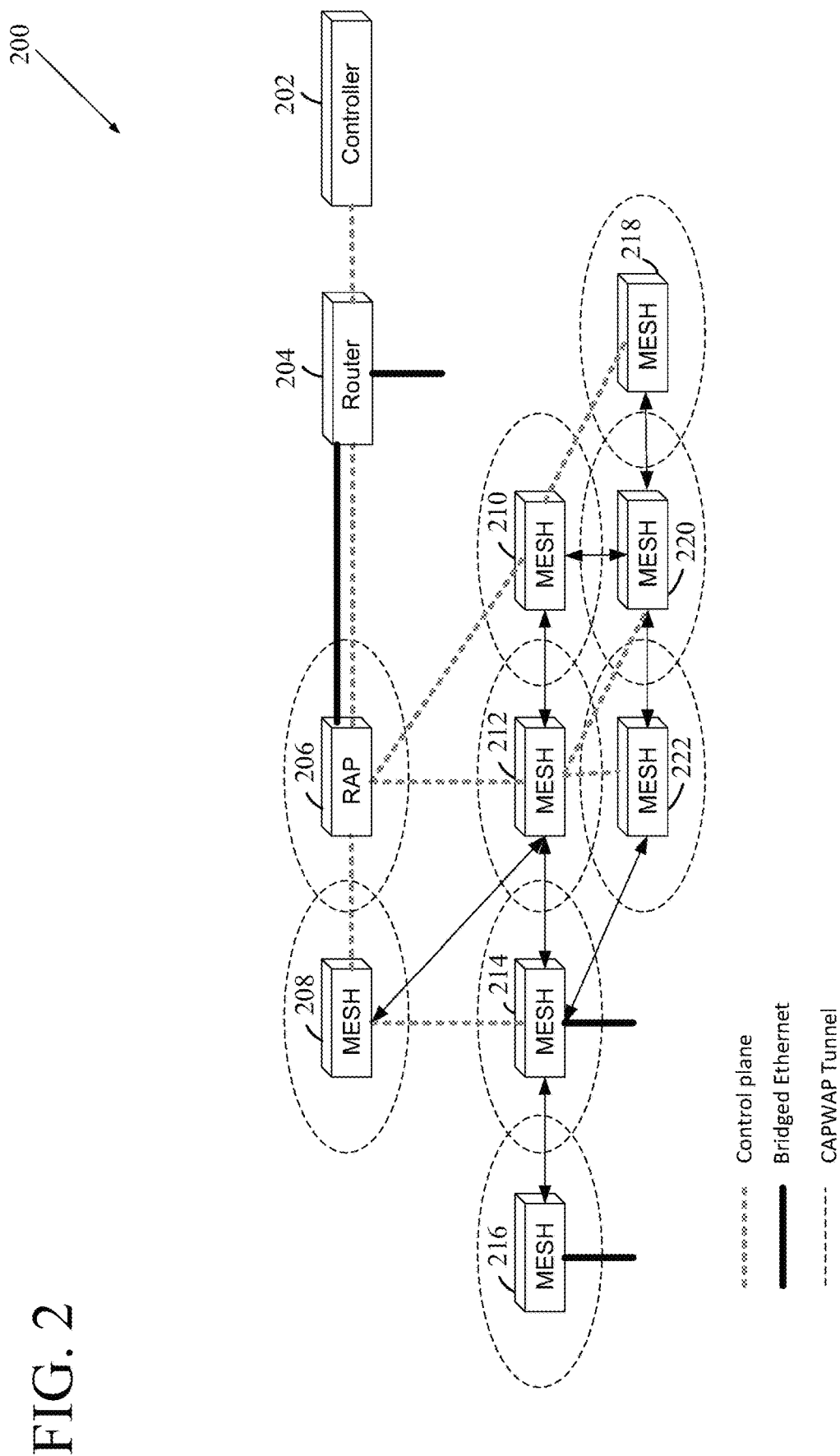
FIG. 2 illustrates an example embodiment of a wireless mesh network, where some of mesh access points have bridged Ethernet connections in accordance with some aspects of present technology.

FIG. 2 illustrates another example of a wireless mesh network 200 including a SDN controller 202, a router 204, a root access point 206, and a plurality of wireless access points 208, 210, 212, 214, 216, 218, 220, and 222. The SDN controller 202 is in charge of controlling the router 204, the root access point 206, and the plurality of wireless access points. None of the wireless access points in the plurality of wireless access points have wired connection to the SDN controller 202. The plurality of wireless access points can be completely wireless and support clients that communicate with other wireless access points or the root access point 206, or can be used to connect to peripheral devices or a wired network. Wired clients that connect directly to wireless access points are called Ethernet bridging devices. The router 204 and the root access point 206 are connected via an Ethernet bridge.

The SDN controller 202 wirelessly controls the router 204, the root access point 206, and the plurality of wireless access points in an exemplary control plane wherein a plurality of control mechanisms (protocols) can be employed by the SDN controller 202.

In FIG. 2, a Control and Provisioning of Wireless Access Points (CAPWAP) protocol can be used between each of wireless access points and the SDN controller 202 to enable the SDN controller 202 to employ different control mechanisms and routing functions.

In FIG. 2, the router 204, the wireless access point 214, and the wireless access point 216 provide possibility of having Ethernet bridging devices.

Figure 3:
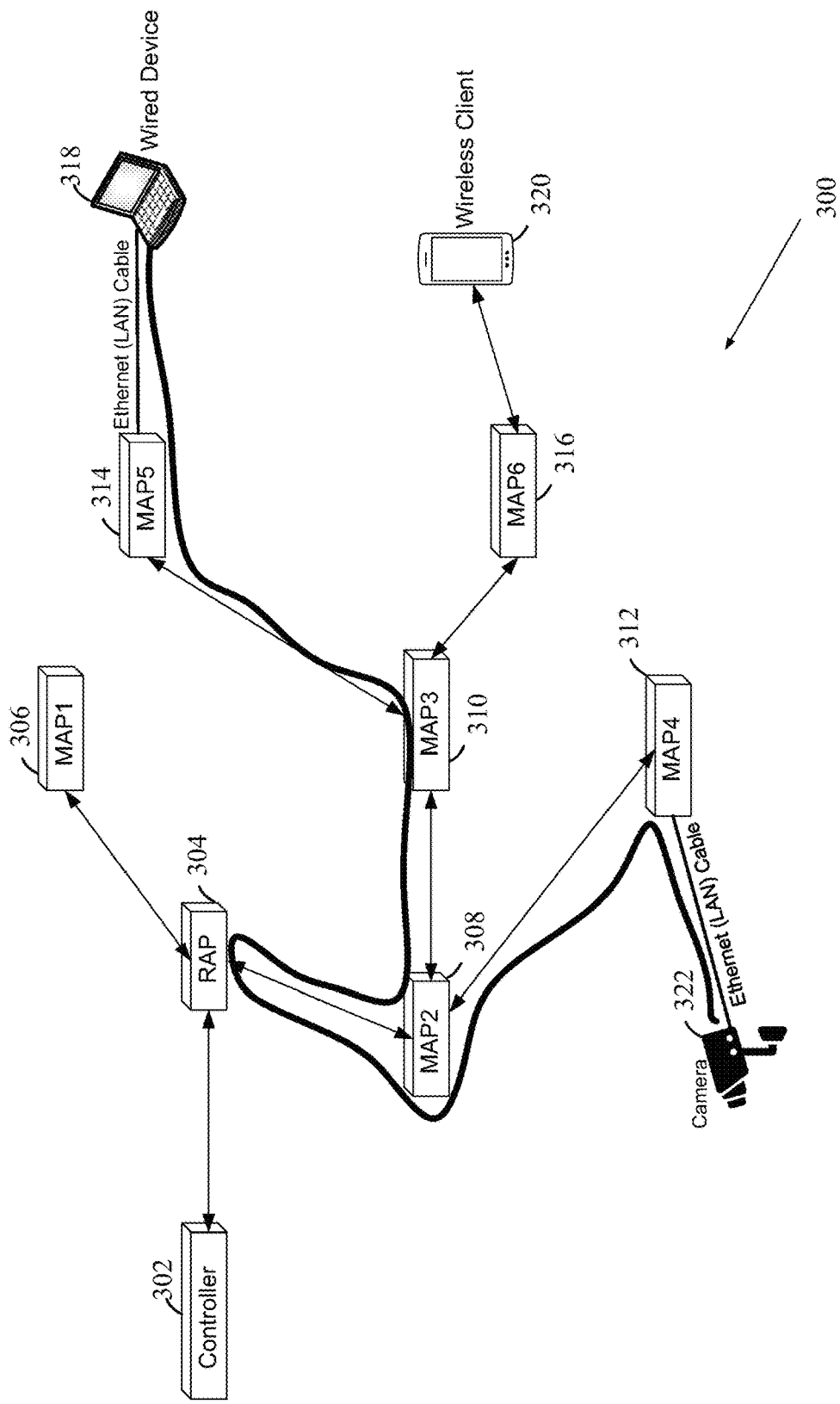
FIG. 3 illustrates an example embodiment showing a route of traffic between two fixed clients in accordance with some aspects of present technology.

FIG. 3 illustrates an example of a wireless mesh network 300 including a SDN controller 302, a root access point 304, a plurality of wireless access points, a wireless device 320 connected wirelessly to the wireless access point 316, a wired device 318 connected to the wireless access point 314 via a wired connection, and a wired camera 322 connected to the wireless access point 312 via a wired connection. The SDN controller 302 has control over the root access point 304 and the plurality of wireless access points.

When the wired device 318 (laptop) wants to communicate with the camera 322, data path follows the wireless access point 314, the wireless access point 310, the wireless access point 308, the root access point 304, the wireless access point 308, and the wireless access point 312, and eventually end in the camera 322. The data path for this communication is depicted in FIG. 3 with a highlighted line. The highlighted line in FIG. 3 is an example of an inefficient route between the wired device 318 and the wired camera 322 that would happen without the present technology.

Figure 4:
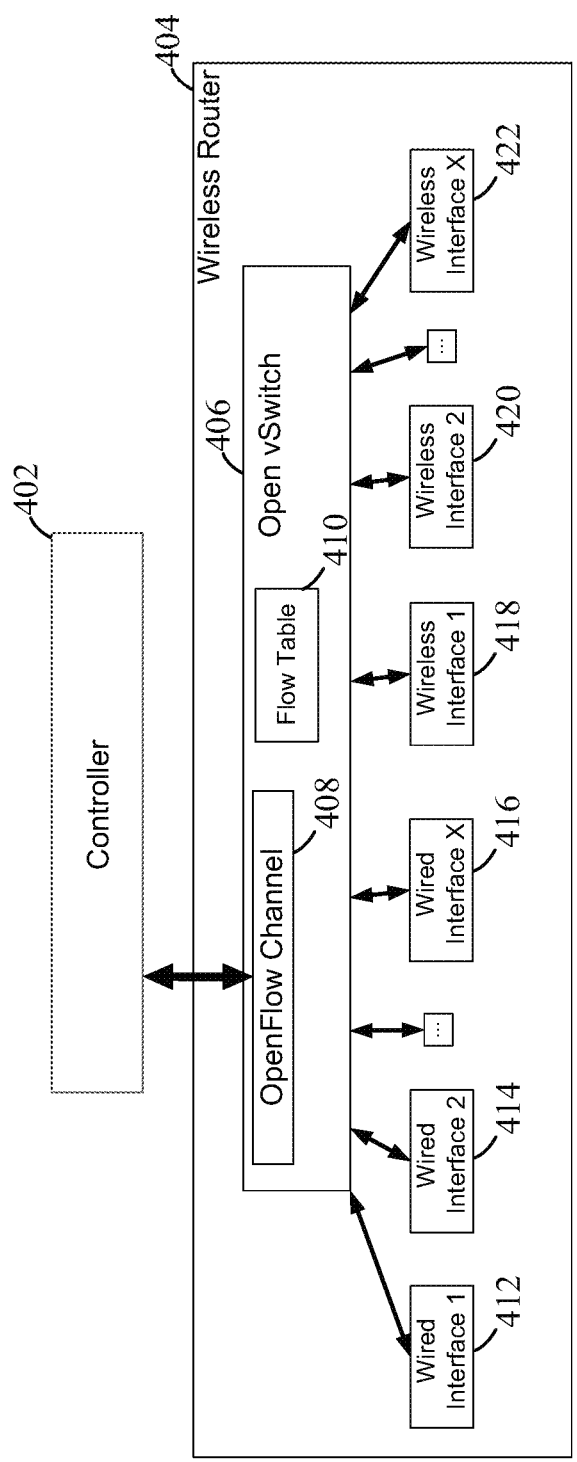
FIG. 4 illustrates an example block diagram of a software-defined networking (SDN) controller and a wireless router in accordance with some aspects of present technology.

FIG. 4 illustrates an architecture of an SDN controller 402 which is in communication with a wireless router 404 in a wireless mesh network. The wireless router 404 can include software for a virtual switch 406 such as, Open vSwitch 406. Further, the wireless router 404 can include a plurality of Wired Interfaces 412, 414, and 416, and a plurality of Wireless Interfaces 418, 420, and 422. The Open vSwitch 406 can communicate with the SDN controller 402 via a data plane using a suitable communications protocol 408 such as an OpenFlow Channel 408 and a Flow Table 410. The Open vSwitch 406 communicates with the plurality of the Wired Interfaces and the plurality of the Wireless Interfaces in the wireless router 404. The OpenFlow Channel 408, embedded in the Open vSwitch 406, is in charge of exchanging information with the SDN controller 402. The Flow Table 410 is configured to store a routing table (not shown) which includes position of the wireless router 404 in a plurality of wireless routers in the wireless mesh network and connection map between the wireless router 404 and other wireless routers in the plurality of wireless routers in the wireless mesh network. Wired devices introduced to the wireless mesh network can be connected to the wireless router 404 via the plurality of Wired Interfaces, which provide connections for Ethernet bridging devices. Also, peripheral wireless devices introduced to the wireless mesh network can be connected to the wireless router 404 via the plurality of Wireless Interfaces.

The Open vSwitch 406 periodically gets updates on the plurality of Wired Interfaces and the plurality of Wireless Interfaces to inspect wired and wireless connections, respectively, and update entries in the routing table. The Open vSwitch 406 is aware of mesh topology in the wireless mesh network. After detection of any change in the plurality of Wired Interfaces and the plurality of Wireless Interfaces, for instance connection of a wired device to one of the Wired Interfaces or a wireless device to one of the Wireless Interfaces, the Open vSwitch 406 updates the routing table in the Flow Table 410 and communicates the change with the SDN controller 402 via the OpenFlow Channel 408.

While FIG. 4 makes reference to use of Open vSwitch and OpenFlow, it will be appreciated by those of ordinary skill in the art that these are provided by way of illustration and other virtual switch implementations and other control plane communications protocols can be well suited to carrying out the specific features of the present technology, and that the present technology should not be limited to use of Open vSwitch and OpenFlow unless specifically enumerated in the appended claims.

Figure 5:
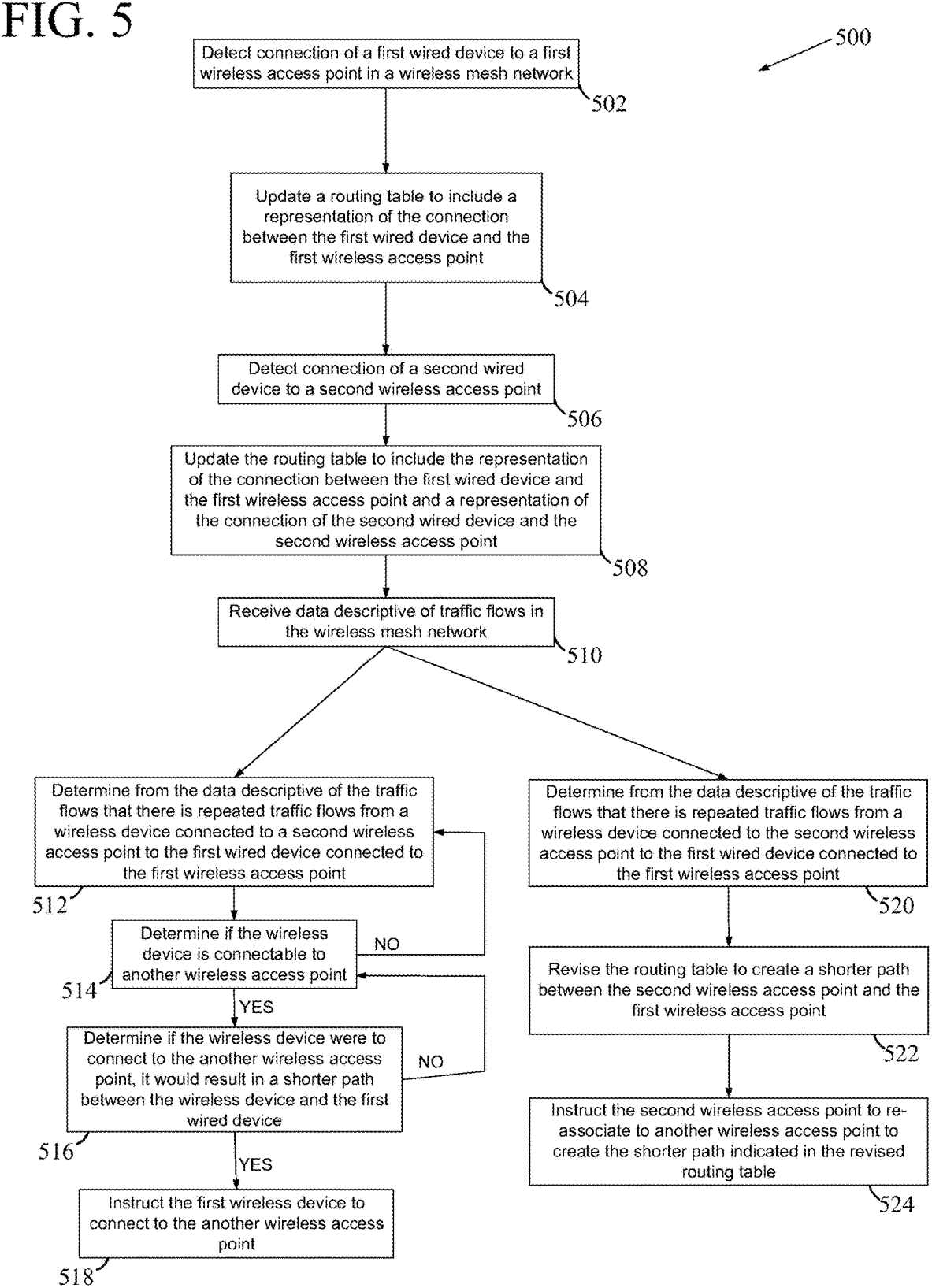
FIG. 5 illustrates an example method embodiment for creating an improved communication path in a wireless mesh network in accordance with some aspects of present technology.

FIG. 5 is a flowchart depicting a method 500 for creating an improved communication path in a wireless mesh network. The method 500 is first described with respect to FIG. 7, then FIG. 8, and then FIG. 9 from a perspective of an SDN controller 702, according to some embodiments of the present technology. While reference is made to multiple figures, no limitation from one figure should be imputed to other figures. No limitations is intended except as otherwise indicated in the appended claims.

At step 502, an SDN controller 702 detects connection of a first wired device 718 to a wireless access point 714. The SDN controller 702, at step 504, updates a routing table to include a representation of the connection between the wired device 718 and the wireless access point 714. At step 506, the SDN controller detects connection of a second wired device 722 to a wireless access point 712 and at step 508, updates the routing table to include the representation of the connection between the first wired device 718 to the wireless access point 714 and a representation of the connection of the second wired device 722 to the second wireless access point 712.

At step 510, the SDN controller 702 receives data descriptive of traffic flows in the wireless mesh network. The function of the SDN controller 702 is now described with respect to FIG. 8. At step 512, the SDN controller 702 determines from the data descriptive of the traffic flows that there is repetitive traffic flows from a wireless device 720 connected to a wireless access point 716 to the first wired device 718 connected to the first wireless access point 714.

At step 514, the SDN controller 702 determines if the wireless device 720 is connectable to another wireless access point. If the SDN controller 702 determines that the wireless device 720 is connectable to the another wireless access point, the SDN controller goes to step 516.

At step 516, the SDN controller 702 determines if the wireless device 720 were to connect to the another wireless access point, it would result in a shorter path between the wireless device 720 and the first wired device 718. If the SDN controller 702 determines that it can create the shorter path between the wireless device 720 and the first wired device 718, the SDN controller proceeds to step 518 and instruct the wireless device 720 to connect to the another wireless access point, which is the wireless access point 714, according to FIG. 8. If the SDN controller determines that it cannot create the shorter path between the wireless device 720 and the first wired device 718, then the SDN controller 702 goes to step 516.

Figure 9:
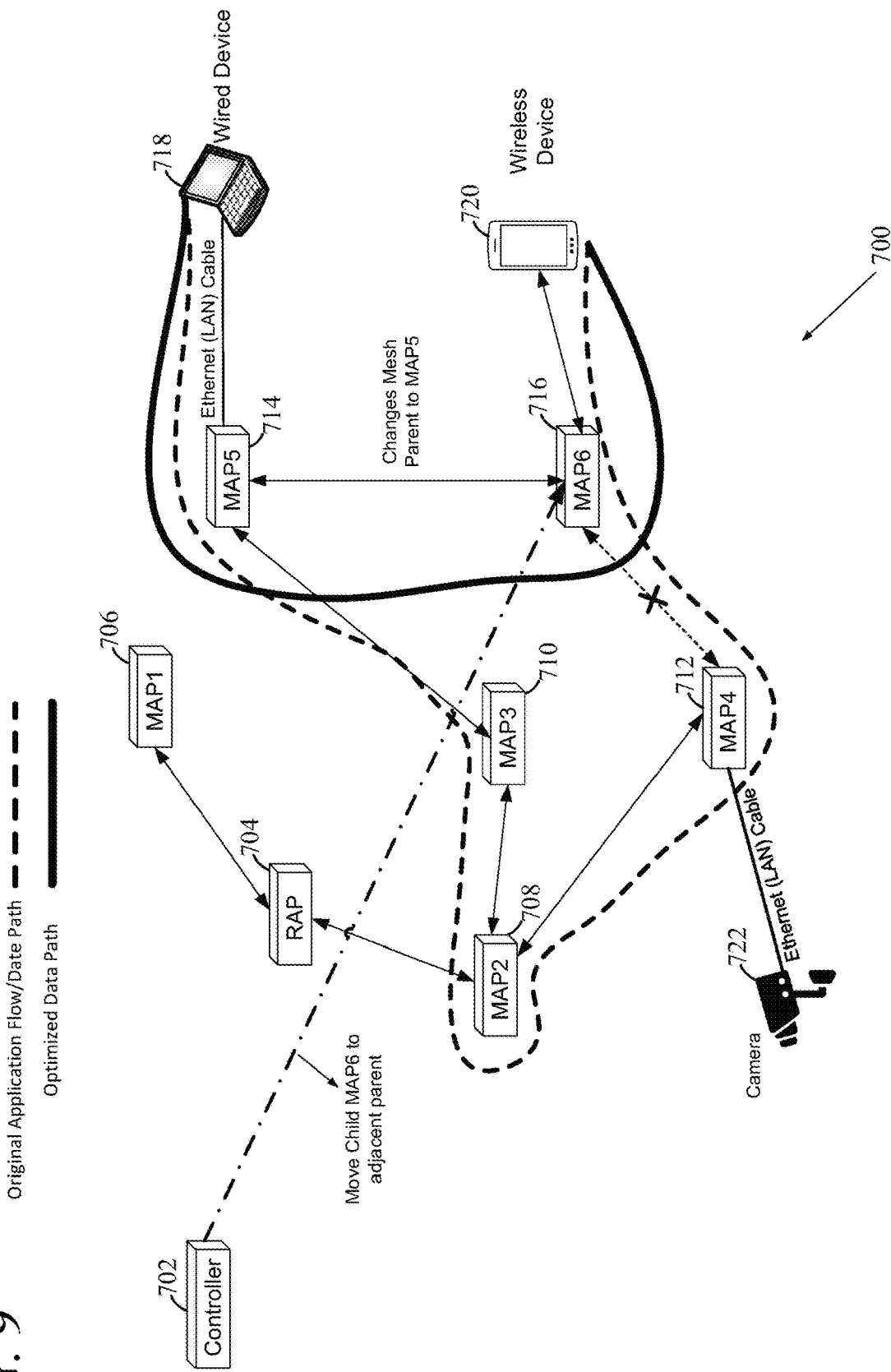
FIG. 9 illustrates an example embodiment of SDN-based traffic flow change between a wireless client and a wired client in a wireless mesh network in accordance with some aspects of present technology.

Going back to step 510, the function of the SDN controller 702 is now described with respect to FIG. 9. After the SDN controller 702 received data descriptive of traffic flows in the wireless mesh network 700 at step 510, the SDN controller 702 proceeds to step 520, where the SDN controller 702 determines from the data descriptive of the traffic flows that there is repeated traffic flows from a wireless device 720 connected to the second wireless access point 716 to the first wired device 718 connected to the first wireless access point 714. At step 522, the SDN controller 702 revises the routing table to create a shorter path (highlighted in FIG. 9) between the second wireless access point 716 and the first wireless access point 714. Then at step 524, the SDN controller 702 instructs the second wireless access point 716 to re-associate to another wireless access point (a wireless access point 714 in FIG. 9) to follow the shorter path.

Figure 6:
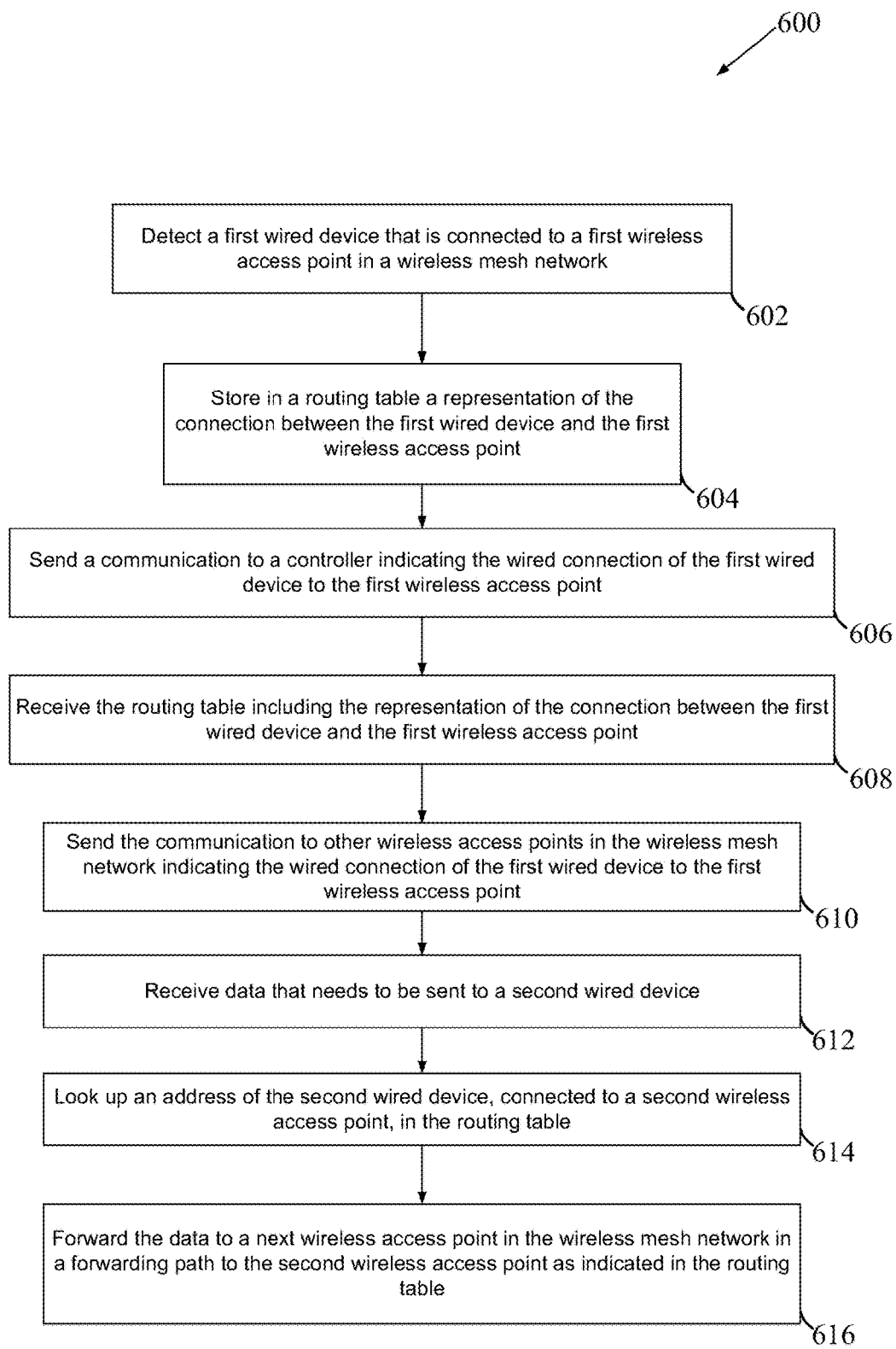
FIG. 6 illustrates an example method embodiment for creating an improved communication path in a wireless mesh network in accordance with some aspects of present technology.
Figure 7:
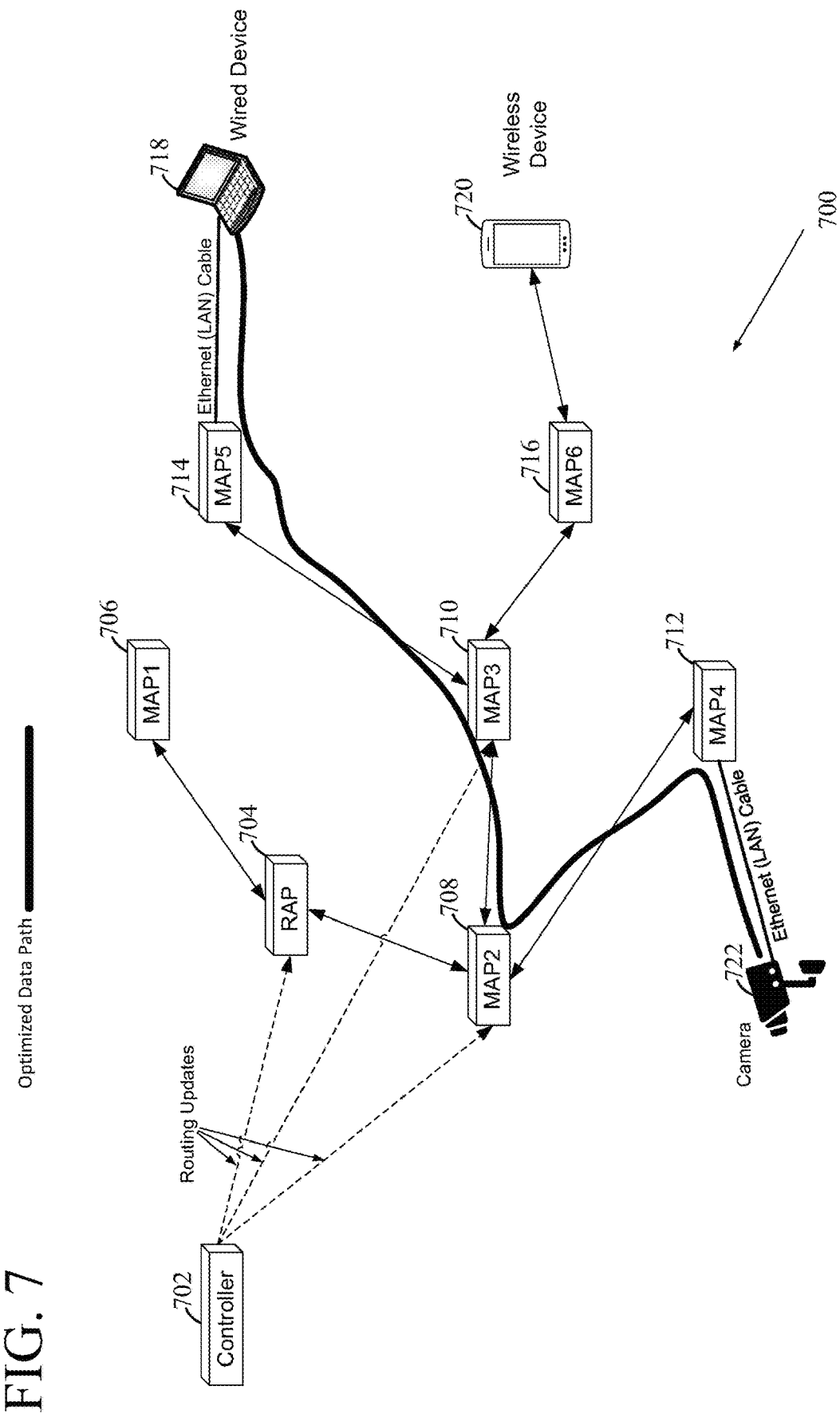
FIG. 7 illustrates an example embodiment of SDN-based routing of Ethernet bridge clients in a wireless mesh network in accordance with some aspects of present technology.

FIG. 6 is a flowchart depicting a method 600 for creating an improved communication path in a wireless mesh network 700 shown in FIG. 7, from a perspective of a wireless access point 714, according to some embodiments. The method 600 begins at step 602, where the wireless access point 714 detects connection of a wired device 718 to one of its Ethernet ports. The wireless access point 714 then stores a representation of its connection to the wired device at step 604. At step 606, the wireless access point 606 sends a communication to an SDN controller 702, announcing the connection of the wired device 718 to the wireless access point 714. Then at step 608, the wireless access point 718 receives the routing table including the representation of the connection between the wired device 718 and the wireless access point 714. At step 610, the wireless access point 714 send the communication to other wireless access points in the wireless mesh network, announcing wired connection of the wired device 718 to the wireless access point 714. At step 612, the wireless access point 714 received data that needs to be sent to a wired device 722. To send the data to the wired device 722, which is connected to wireless access point 712, the wireless access point 714 looks up an address of the wired device 722 in the routing table. At step 616, the wireless access point 714 forward the data to a next wireless access point in the wireless mesh network in a forwarding path to the wireless access point 712 as indicated in the routing table.

FIG. 7 illustrates a wireless mesh network 700 with a configuration similar to the one depicted in FIG. 3. An SDN controller 702 is in charge of controlling a plurality of wireless access points 706, 708, 710, 712, 714, and 716 and a root access point 704. A wired device 718 is connected to the wireless access point 714 via LAN cable, a wireless device 720 is connected to the wireless access point 716, and a wired camera 722 is connected to the wireless access point 712 via LAN cable. Each of the wireless access points and the root access point in FIG. 7 have internal structures similar to the wireless router 404 shown in FIG. 4. In contrast with what was shown in FIG. 3, wherein the communication path between the two wired devices 318 and 322 had to be directed to the root access point 304, the communication path between the wired device 718 and the wired camera 722 in FIG. 7 does not go through the root access point 704. After detection of connection of the wired device 718 to the wireless access point 714 and connection of the wired camera 722 to the wireless access point 712, connection updates are sent to the SDN controller 702. The SDN controller 702 then updates the routing table, according to the flowchart depicted in FIG. 5, and sends the routing updates to the root access point 704, the wireless access point 710, and the wireless access point 708. Instead of going through the root access point 704, the communication path between the wired device 718 and the wired camera 722 in FIG. 7 goes through the wireless access point 714, the wireless access point 710, the wireless access point 708, and the wireless access point 712.

Figure 8:
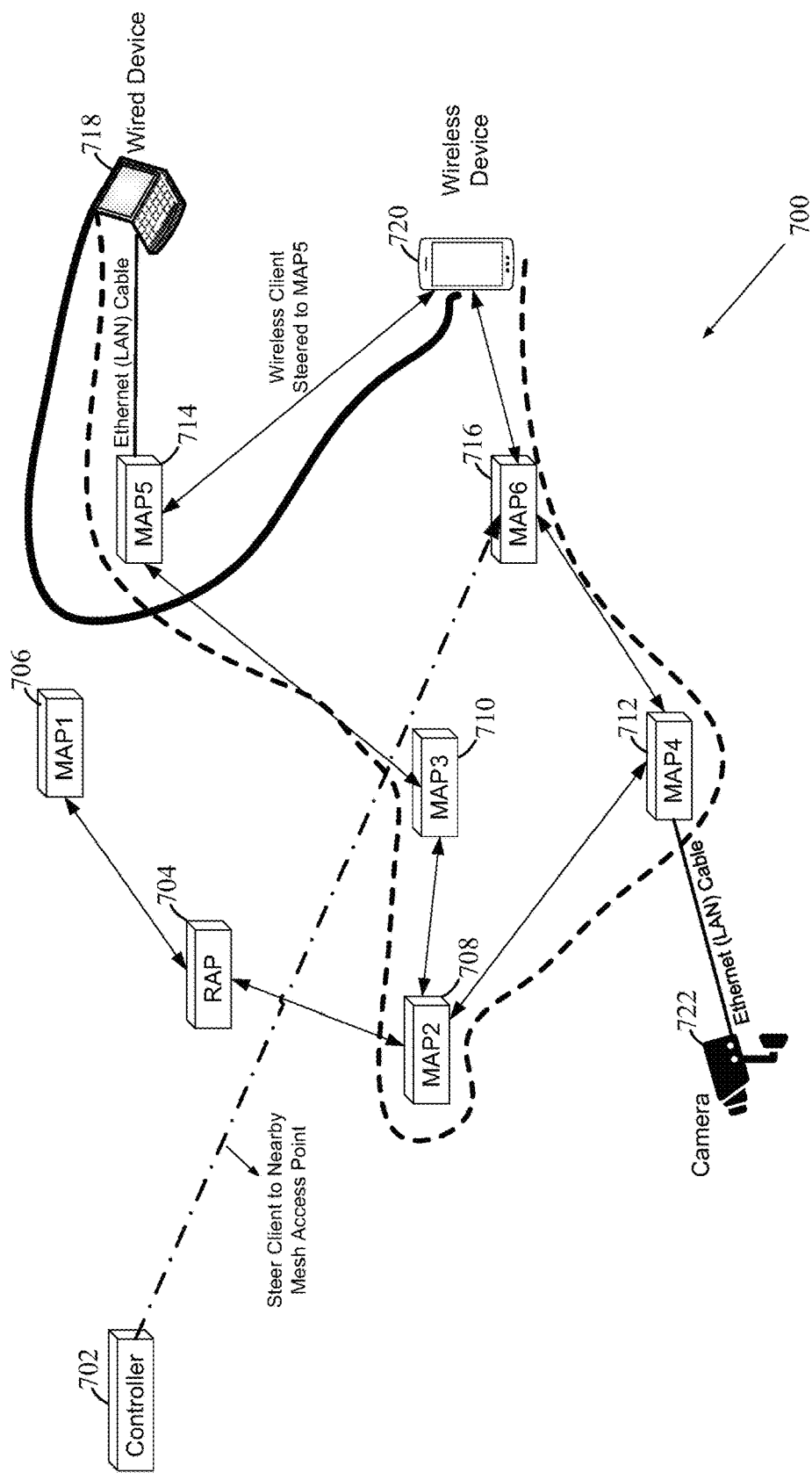
FIG. 8 illustrates an example embodiment of SDN-based traffic flow change between a wireless client and a wired client in a wireless mesh network in accordance with some aspects of present technology.

FIG. 8 illustrates the wireless mesh network 700 according to some embodiments of the present technology. Without using the present technology, the data path from the wireless device 720 to the wired device 718 follows a non-optimal path. In the non-optimal path shown in FIG. 8 with a dashed line, the communication starts from the wireless device 720, goes to the wireless access point 716, the wireless access point 712, the wireless access point 708, the wireless access point 708, the wireless access point 710, the wireless access point 714, and finally the wired device 718. When there is consistent amount of higher bandwidth application data usage between the wireless device 720 and the wired device 718, it creates unnecessarily contention in wireless access points along the communication path. Since the SDN controller 702 has awareness with respect to the wireless device's proximity to the nearby wireless access point 714, it sends command to the wireless access point 716 to steer the wireless access point 714 to the wireless access point 714, thereby leads to significant improvement in the overall communication between the wireless device 720 and the wired device 718. The new and optimal communication path between the wireless device 720 and the wired device 718 is highlighted in FIG. 8.

FIG. 9 illustrates the wireless mesh network 700 according to some embodiments of the present technology. Without using the present technology, the communication path between the wireless device 720 and the wired device 718 is shown in FIG. 9 with a dotted line, which goes through the wireless access point 716, the wireless access point 712, the wireless access point 708, the wireless access point 710, the wireless access point 714, and the wired device 718. Since the SDN controller 702 is aware of proximity of the wireless access point 716 and the wireless access point 714, the SDN controller 702 can changes the communication path between the wireless device 720 and the wired device 718 and create an improved and optimal communication path, depicted in FIG. 9 with a solid line. In the improved and optimal communication path, when the wireless device 720 sends large amounts of data traffic to the nearby wired device 718 for significant amount of time, the SDN controller 702 notifies the wireless access point 716 to change its parent wireless access point from the wireless access point 712 to the wireless access point 714, where overall path can be reduced significantly. In fact, communication path between the wireless device 720 and the wired device 718 becomes much shorter as only two wireless access points, instead of five wireless access points, are involved. This will help reduce contention at parent wireless access points for significant amount of traffic imposed by their children wireless access points.

Figure 10:
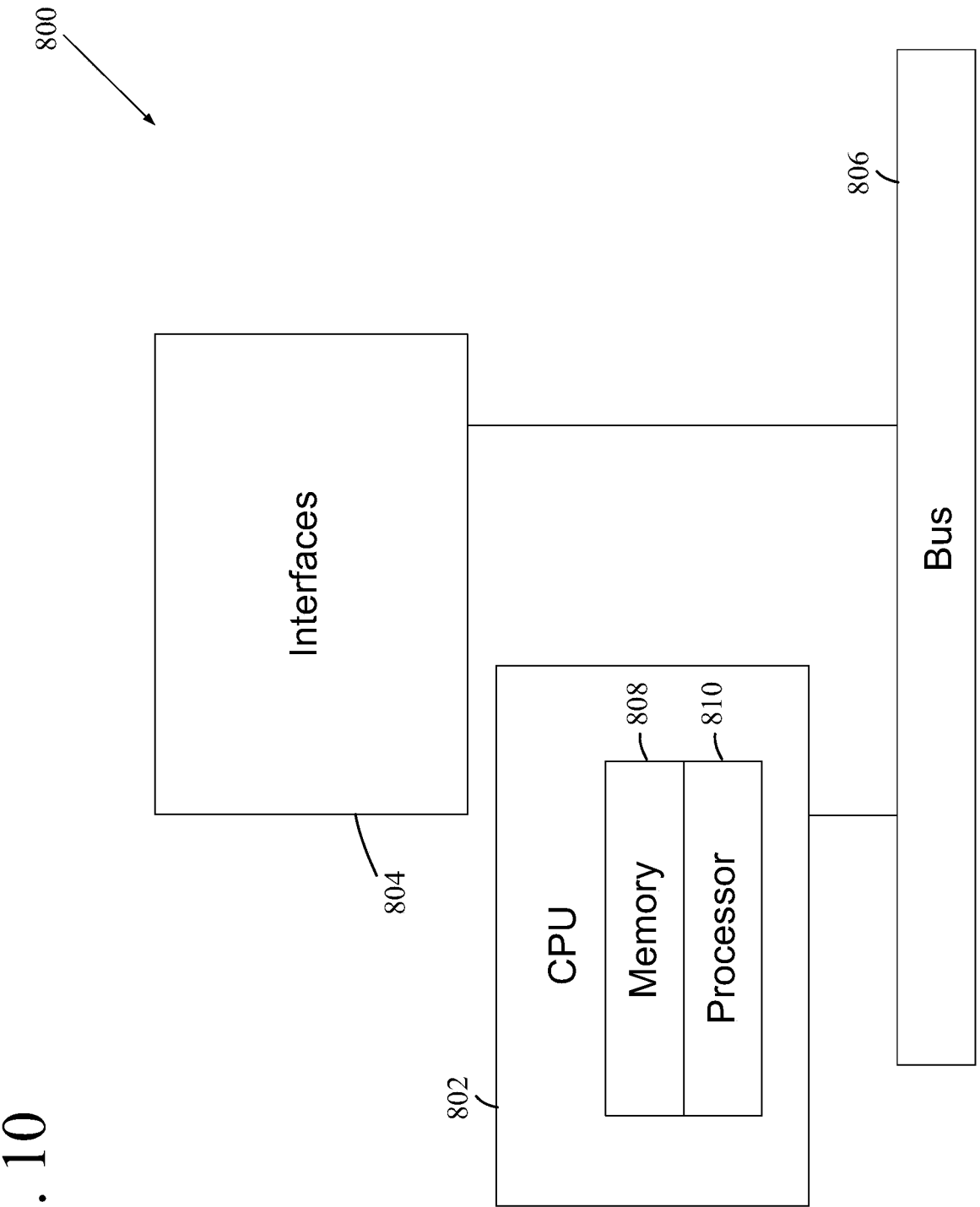
FIG. 10 illustrates an example of a networking device in accordance with some aspects of present technology.

FIG. 10 illustrates an example a network device 800 (e.g., switch, router, network appliance, etc.). The network device 800 can include a master central processing unit (CPU) 802, interfaces 804, and a bus 806 (e.g., a PCI bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative embodiment, the processor 808 can be specially designed hardware for controlling the operations of the network device 800. In an embodiment, a memory 810 (such as non-volatile RAM and/or ROM) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 10 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 11:
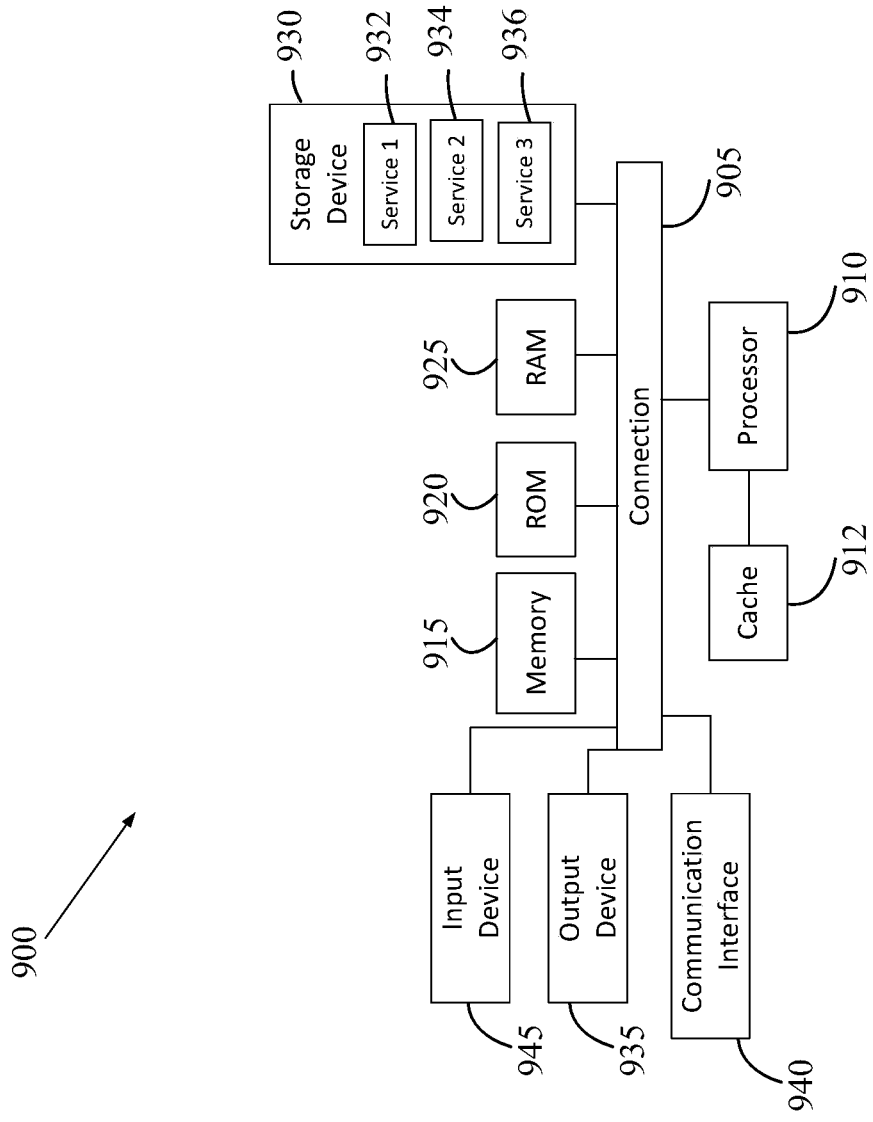
FIG. 11 illustrates an example of a computing system in accordance with some aspects of present technology.

FIG. 11 shows an example of a computing system architecture 900, which can be for example any computing device making up a controller, or a wireless access point or any component thereof in which the components of the system are in communication with each other using a connection 905. The connection 905 can be a physical connection via a bus, or a direct connection into a processor 910, such as in a chipset architecture. The connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and a connection 905 that couples various system components including system memory 915, such as read only memory (ROM) 920 and random access memory (RAM) 925 to processor 910. The computing system 900 can include a cache of high-speed memory 912 connected directly with, in close proximity to, or integrated as part of the processor 910.

The processor 910 can include any general purpose processor and a hardware service or a software service, such as services 932, 934, and 936 stored in a storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms known to those of skill in the art. In some instances, multimodal systems can enable a user to provide multiple types of input/output to communicate with the computing system 900. The computing system 900 can include a communications interface 940, which can generally govern and manage the user input and system output. There is no restriction on operating on any particular hardware arrangement and therefore the basic features here may easily be substituted for improved hardware or firmware arrangements as they are developed.

A storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as the processor 910, the connection 905, the output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable storage medium comprising instructions, the instructions effective to cause at least one processor to perform operations comprising:
   learn, by a software-defined networking (SDN) controller of a wireless mesh network, of a wired connection of a first wired device to a first wireless access point in the wireless mesh network; and
   update a forwarding table for distribution to wireless access points in the wireless mesh network after the SDN controller learns of the wired connection of the first wired device to the first wireless access point, the forwarding table to include a representation of the wired connection between the first wired device and the first wireless access point;
   first determine that there is repeated traffic flows from a wireless client connected to a second wireless access point to the first wired device connected to the first wireless access point in the wireless mesh network on a path having a first length;
   second determine that the wireless device is connectable to another wireless access point, that if the wireless device were to connect to the another wireless access point, it would result in a shorter path between the wireless device and the first wired device; and
   instruct, in response to the second determine, the wireless client to connect to the another access point.

2. The non-transitory computer readable medium of claim 1, comprising further instructions, the further instructions effective to cause the at least one processor to:
   learn of a second wired connection of a second wired device to a second wireless access point; and
   update the forwarding table for distribution to the wireless access points in the wireless mesh network after the SDN controller learns of the connection of the second wired device to the second wireless access point, the forwarding table to include a representation of the connection between the first wired device and the first wireless access point and the connection between the second wired device and the second wireless access point.

3. The non-transitory computer readable medium of claim 1, comprising further instructions, the further instructions effective to cause the at least one processor to:
   receive data descriptive of traffic flows in the wireless mesh network;
   determine from the data descriptive of the traffic flows in the wireless mesh network that there is repeated traffic flows from a second wireless access point to the first wired device connected to the first wireless access point in the wireless mesh network;
   revise the forwarding table to create a shorter path between the second wireless access point and the first wireless access point in the wireless mesh network.

4. The non-transitory computer readable medium of claim 3, comprising further instructions, the further instructions effective to cause the at least one processor to:
   instruct the second wireless access point to re-associate to another wireless access point in the wireless mesh network to create the shorter path indicated in the revised forwarding table.

5. A system comprising:
   at least one non-transitory computer readable medium storing instructions thereon; and
   at least one processor programmed to execute the instructions to cause the system to perform operations comprising:
      learn, by a software-defined networking (SDN) controller of a wireless mesh network, of a wired connection of a first wired device to a first wireless access point in the wireless mesh network; and
      update a forwarding table for distribution to wireless access points in the wireless mesh network after the SDN controller learns of the wired connection of the first wired device to the first wireless access point, the forwarding table to include a representation of the wired connection between the first wired device and the first wireless access point;
      first determine that there is repeated traffic flows from a wireless client connected to a second wireless access point to the first wired device connected to the first wireless access point in the wireless mesh network on a path having a first length;
      second determine that the wireless device is connectable to another wireless access point, that if the wireless device were to connect to the another wireless access point, it would result in a shorter path between the wireless device and the first wired device; and
      instruct, in response to the second determine, the wireless client to connect to the another access point.

6. The system of claim 5, the operations further comprising:
   learn of a second wired connection of a second wired device to a second wireless access point; and
   update the forwarding table for distribution to the wireless access points in the wireless mesh network after the SDN controller learns of the connection of the second wired device to the second wireless access point, the forwarding table to include a representation of the connection between the first wired device and the first wireless access point and the connection between the second wired device and the second wireless access point.

7. The system of claim 5, the operations further comprising:
   receive data descriptive of traffic flows in the wireless mesh network;
   determine from the data descriptive of the traffic flows in the wireless mesh network that there is repeated traffic flows from a second wireless access point to the first wired device connected to the first wireless access point in the wireless mesh network;
   revise the forwarding table to create a shorter path between the second wireless access point and the first wireless access point in the wireless mesh network.

8. The system of claim 7, the operations further comprising:
   instruct the second wireless access point to re-associate to another wireless access point in the wireless mesh network to create the shorter path indicated in the revised forwarding table.

9. A method, comprising:

learning, by a software-defined networking (SDN) controller of a wireless mesh network, of a wired connection of a first wired device to a first wireless access point in the wireless mesh network; and updating a forwarding table for distribution to wireless access points in the wireless mesh network after the SDN controller learns of the wired connection of the first wired device to the first wireless access point, the forwarding table to include a representation of the wired connection between the first wired device and the first wireless access point;

first determining that there is repeated traffic flows from a wireless client connected to a second wireless access point to the first wired device connected to the first wireless access point in the wireless mesh network on a path having a first length;

second determining that the wireless device is connectable to another wireless access point, that if the wireless device were to connect to the another wireless access point, it would result in a shorter path between the wireless device and the first wired device; and instructing, in response to the second determining, the wireless client to connect to the another access point.

10. The method of claim 9, further comprising:

learning of a second wired connection of a second wired device to a second wireless access point; and updating the forwarding table for distribution to the wireless access points in the wireless mesh network after the SDN controller learns of the connection of the second wired device to the second wireless access point, the forwarding table to include a representation of the connection between the first wired device and the first wireless access point and the connection between the second wired device and the second wireless access point.

11. The method of claim 9, further comprising:

receiving data descriptive of traffic flows in the wireless mesh network;

determining from the data descriptive of the traffic flows in the wireless mesh network that there is repeated traffic flows from a second wireless access point to the first wired device connected to the first wireless access point in the wireless mesh network;

revising the forwarding table to create a shorter path between the second wireless access point and the first wireless access point in the wireless mesh network.

12. The method of claim 11, further comprising:

instructing the second wireless access point to re-associate to another wireless access point in the wireless mesh network to create the shorter path indicated in the revised forwarding table.

* * * * *